US009105918B2

(12) United States Patent
Chun

(10) Patent No.: US 9,105,918 B2
(45) Date of Patent: Aug. 11, 2015

(54) SAFETY ELEMENT ASSEMBLY

(75) Inventor: Kwan-Sic Chun, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 963 days.

(21) Appl. No.: 12/844,676

(22) Filed: Jul. 27, 2010

(65) Prior Publication Data

US 2011/0117400 A1 May 19, 2011

(30) Foreign Application Priority Data

Nov. 16, 2009 (KR) .................... 10-2009-0110363
Nov. 16, 2009 (KR) .................... 10-2009-0110364

(51) Int. Cl.
*H01M 2/00* (2006.01)
*H01M 2/34* (2006.01)
*H01M 10/04* (2006.01)

(52) U.S. Cl.
CPC ............. *H01M 2/34* (2013.01); *H01M 2/348* (2013.01); *H01M 10/0422* (2013.01); *Y10T 29/53135* (2015.01)

(58) Field of Classification Search
USPC ............ 429/153, 61, 163, 62; 338/215; 320/112, 150, 154; 361/103, 105, 106
See application file for complete search history.

(56) References Cited

U.S. PATENT DOCUMENTS

| 4,006,443 | A | * | 2/1977 | Kouchich et al. ............. 338/215 |
| 4,971,867 | A | * | 11/1990 | Watanabe et al. ............. 429/61 |
| 5,212,466 | A | * | 5/1993 | Yamada et al. ............. 338/22 R |
| 5,703,463 | A | | 12/1997 | Smith |
| 5,939,968 | A | | 8/1999 | Nguyen et al. |
| 6,114,942 | A | * | 9/2000 | Kitamoto et al. ............. 338/22 R |
| 6,356,051 | B1 | * | 3/2002 | Hasunuma et al. ............. 320/107 |
| 6,617,069 | B1 | * | 9/2003 | Hopper et al. ............. 429/61 |
| 6,794,980 | B2 | * | 9/2004 | Chu et al. ............. 338/22 R |
| 7,352,272 | B2 | * | 4/2008 | Wang et al. ............. 338/22 R |
| 7,474,076 | B2 | | 1/2009 | Kim |
| 7,609,142 | B2 | * | 10/2009 | Koyama et al. ............. 338/22 R |
| 2005/0026033 | A1 | | 2/2005 | Kawano et al. |
| 2007/0090809 | A1 | * | 4/2007 | Miyasaka ............. 320/150 |
| 2008/0118820 | A1 | | 5/2008 | Jang et al. |
| 2008/0206633 | A1 | | 8/2008 | Matsuoka |

(Continued)

FOREIGN PATENT DOCUMENTS

CN  2 899 126  5/2007
CN  101257104 A  9/2008

(Continued)

OTHER PUBLICATIONS

U.S. Appl. No. 12/844,681, filed Jul. 27, 2010, Kwan-Sic Chun.

(Continued)

*Primary Examiner* — Richard Isla Rodas
*Assistant Examiner* — Michael Dibenedetto
(74) *Attorney, Agent, or Firm* — Knobbe Martens Olson & Bear LLP

(57) ABSTRACT

A safety element assembly is disclosed. The safety element assembly comprises a first thin metal sheet coupled to the secondary battery; a safety element coupled to the first thin metal sheet; and a second thin metal sheet coupled to the safety element, wherein the first thin metal sheet comprises a first region on which the safety element and the second thin metal sheet are stacked, and a second region on which the safety element and the second thin metal sheet are not stacked.

20 Claims, 8 Drawing Sheets

(56) References Cited

U.S. PATENT DOCUMENTS

| | | | |
|---|---|---|---|
| 2008/0254358 A1* | 10/2008 | Takase et al. | 429/163 |
| 2008/0254359 A1* | 10/2008 | Byun et al. | 429/163 |
| 2009/0081539 A1* | 3/2009 | Koh et al. | 429/178 |
| 2009/0123831 A1* | 5/2009 | Kim | 429/163 |
| 2009/0297941 A1* | 12/2009 | Shen et al. | 429/163 |
| 2010/0015522 A1* | 1/2010 | Hasunuma et al. | 429/175 |
| 2010/0086833 A1* | 4/2010 | Pozin et al. | 429/50 |
| 2010/0279170 A1* | 11/2010 | Lee et al. | 429/178 |
| 2011/0117390 A1 | 5/2011 | Chun | |

FOREIGN PATENT DOCUMENTS

| | | | |
|---|---|---|---|
| EP | 2 058 875 A2 | | 5/2009 |
| JP | 03-87001 | | 4/1991 |
| JP | 06-38157 | | 5/1994 |
| JP | 1995-065856 | | 3/1995 |
| JP | 07-041974 U | | 7/1995 |
| JP | 2000-513149 | | 10/2000 |
| JP | 2000-340192 A | | 12/2000 |
| JP | 2000340192 A | * | 12/2000 |
| JP | 2007-184138 | | 7/2007 |
| JP | 2008-71828 | | 3/2008 |
| JP | 2008-091505 | | 4/2008 |
| JP | 2011-108630 | | 6/2011 |
| KR | 10-2007-0076170 A | | 7/2007 |
| KR | 10-2007-0081306 | | 8/2007 |
| KR | 10-2009-0055699 | | 6/2009 |
| WO | WO97/49102 | | 12/1997 |

OTHER PUBLICATIONS

Extended European Search Report dated Sep. 6, 2011 for priority EP Application No. 10190230.2.

Office Action dated Jan. 9, 2013 for corresponding U.S. Appl. No. 12/844,681.

European Extended Search Report from the corresponding European Patent Application No. 10190234.4 dated Sep. 6, 2011.

Office Action dated Jan. 29, 2013 for corresponding JP Application No. 2010-141573.

Chinese Office Action dated Jan. 13, 2014 for Chinese Patent Application No. CN 201010551684.6 which shares priority of Korean Publication Nos. KR 10-2009-0110363 and KR 10-2009-0110364, each filed Nov. 16, 2009, with captioned U.S. Appl. No. 12/844,676.

The Second Chinese Office Action dated Jul. 21, 2014 for Chinese Patent Application No. CN 201010551684.6 which shares priority of Korean Publication Nos. KR 10-2009-0110363 and KR 10-2009-0110364, each filed Nov. 16, 2009, with captioned U.S. Appl. No. 12/844,676.

* cited by examiner

SAFETY ELEMENT ASSEMBLY

CROSS-REFERENCE TO RELATED PATENT APPLICATIONS

This application claims the benefit of Korean Patent Application No. 10-2009-0110363 and 2009-0110364, filed on Nov. 16, 2009, in the Korean Intellectual Property Office, the disclosures of which are incorporated herein in its entirety by reference. This application is also related to and incorporates herein by reference the entire content of the concurrently filed application: SECONDARY BATTERY AND METHOD OF MANUFACTURING THE SAME Ser. No. 12/844,681.

BACKGROUND

1. Field

The present technology relates to a safety element assembly for protecting a secondary battery from overheat and overcurrent.

2. Description of the Related Technology

Generally, unlike a primary battery, a secondary battery is a battery that may be charged and discharged. Secondary batteries are typically used as sources of energy for mobile devices, such as a laptop computer or a cellular phone, electric drills, electric vehicles, hybrid electric vehicles, electric bicycles, uninterruptible power supplies (UPS), and the like. Examples of the most generally used secondary batteries include a lithium secondary battery and a nickel-hydride battery. Secondary batteries can be categorized into cylindrical types, rectangular types, and pouch types according to their shapes.

A secondary battery typically includes a safety element assembly to secure safety of the secondary battery. Examples of safety element assemblies include a positive temperature coefficient (PTC) assembly, a safety vent, a current interrupt device, a thermal fuse, a shut-down separator, and the like.

Electronic devices using secondary batteries as a source of energy may be categorized into devices demanding high capacity and devices demanding high power.

High capacity secondary batteries may require use of a PTC assembly for safety. For example, mobile devices, such as a laptop computer or a cellular phone, may employ a secondary battery with a PTC assembly for safety. Meanwhile, a PTC assembly may not be necessary for a high power secondary battery. For example, a secondary battery without a PTC assembly is suitable for devices requiring high power rather than safety, such as an electric drill or an electric vehicle. Therefore, it is necessary to manufacture and manage secondary batteries according to separate standards based on whether high power or high capacity is desired.

SUMMARY

Embodiments of the present invention provide a safety element assembly for using a standardized secondary battery regardless of conditions for using high capacity and high power electric-electronic devices.

According to an aspect of the present invention, a safety element assembly of a secondary battery comprises a first thin metal sheet coupled to the secondary battery; a safety element coupled to the first thin metal sheet; and a second thin metal sheet coupled to the safety element, wherein the first thin metal sheet comprises a first region on which the safety element and the second thin metal sheet are stacked, and a second region on which the safety element and the second thin metal sheet are not stacked.

According to another aspect, the first thin metal sheet is larger than the second thin metal sheet.

According to another aspect, curvature radiuses of the first thin metal sheet, the safety element, and the second thin metal sheet are the same, and the safety element and the second thin metal sheet are at least partially cut, so that the second region of the first thin metal sheet is exposed.

According to another aspect, the safety element comprises a positive temperature coefficient (PTC) element.

According to another aspect, the safety element assembly further comprises an insulator interposed between the first thin metal sheet and the second thin metal sheet.

According to another aspect, curvature radiuses of the first thin metal sheet, the safety element, and the second thin metal sheet are the same, the first thin metal sheet has a circular shape, the second thin metal sheet has a partial circular shape, the safety element is a PTC element having a partial ring shape, and the insulator has a partial circular shape and is located in a space formed by an inner wall of the PTC element.

According to another aspect, curvature radiuses of the first thin metal sheet, the safety element, and the second thin metal sheet are the same, the first thin metal sheet has a circular shape, the second thin metal sheet has a partial circular shape, the safety element is a PTC element having a partial circular shape and a cut end, the insulator has a circular shape of which two portions at opposite sides are cut and have straight edges, and the insulator is arranged such that a straight edge of the insulator contacts the cut end of the safety element.

According to another aspect, curvature radiuses of the first thin metal sheet, the safety element, and the second thin metal sheet are the same, the first thin metal sheet has a ring shape, the second thin metal sheet has a partial circular shape, the safety element is a PTC element having a partial ring shape, and the insulator has a partial circular shape and is located in a space formed by an inner wall of the safety element.

According to another aspect, curvature radiuses of the first thin metal sheet, the safety element, and the second thin metal sheet are the same, the first thin metal sheet has a circular shape, the second thin metal sheet has a partial circular shape, and the safety element is a PTC element having a partial circular shape.

According to another aspect, the safety element is a thermal fuse of which a first end is electrically connected to the first thin metal sheet and a second end is electrically connected to the second thin metal sheet, and the insulator is arranged between the first thin metal sheet and the second thin metal sheet around the thermal fuse.

According to another aspect, the insulator is arranged on a sidewall of the safety element, and a surface of the first thin metal sheet is larger than combined surfaces of the safety element and the insulator.

BRIEF DESCRIPTION OF THE DRAWINGS

The above and other features and advantages of the present invention will become more apparent by describing in detail certain embodiments with reference to the attached drawings in which:

FIG. 14A is a diagram showing that a battery can is prepared according to an embodiment of the present invention, FIG. 14B is a diagram showing a first thin metal sheet welded to the battery can of FIG. 14A, FIG. 14C is a diagram showing an insulator interposed between the first and second thin metal sheets in FIG. 14B, and FIG. 14D is a diagram showing an external lead plate welded to the second thin metal sheet of FIG. 14C.

DETAILED DESCRIPTION

Figure 1:
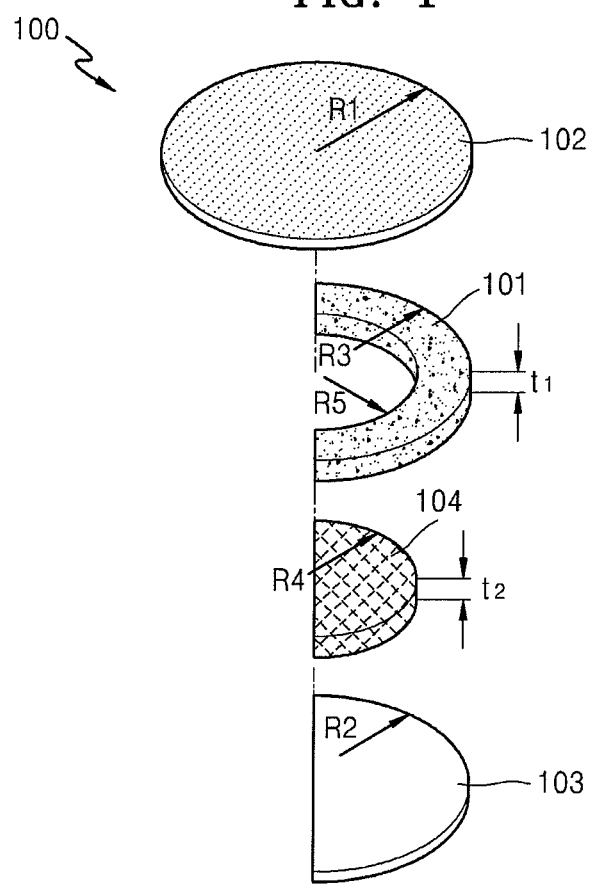
FIG. 1 is an exploded perspective view of a safety element assembly according to an embodiment of the present invention.

FIG. 1 is an exploded perspective view of a safety element assembly 100 according to an embodiment of the present invention.

Referring to FIG. 1, the safety element assembly 100 can include a safety element 101, a first thin metal sheet 102, a second thin metal sheet 103, and an insulator 104. The safety element assembly 100 is a safety device against overheat and overcurrent. The safety element assembly 100 protects a secondary battery by blocking current flowing into the secondary battery when overcurrent flows while the secondary battery is being charged or discharged.

The safety element 101 may be a positive temperature coefficient (PTC) element. The PTC element 101 is a polymer element containing conductive particles.

The PTC element 101 may be formed of a conductive polymer-based composite, and the conductive polymer-based composite may be a mixture of a polymer, a conductive filler, an anti-oxidization agent, and a peroxide coupling agent. The polymer may be, for example, high density polyethylene (HDPE), low density polyethylene (LDPE), vinylidene polyfluoride (PVDF), polypropylene (PP), or ethylene/polypropylene co-polymer. The conductive filler may be formed of carbon black, carbon fiber, a metal (e.g. nickel (Ni)), or a metal oxide.

Polymers are generally used as insulation materials. However, the PTC element 101 exhibits excellent conductivity because the conductive particles therein provide conduction paths by being mutually connected at or below room temperature due to the conductive filler.

When a temperature of a secondary battery in which the PTC element 101 is used exceeds a certain temperature or overcurrent flows, intervals between the conductive particles can increase as the polymer in the PCT element 101 expands, and conductive paths can thus be blocked. As a result, the conductivity of the PTC element 101 can significantly deteriorate.

The first thin metal sheet 102 may be located on a top surface of the PTC element 101, whereas the second thin metal sheet 103 may be located on a bottom surface of the PTC element 101. The first thin metal sheet 102 may be electrically connected to a terminal of a secondary battery, whereas the second thin metal sheet 103 may be electrically connected to a terminal of a protective circuit board module or a terminal of an external device. The first thin metal sheet 102 and the second thin metal sheet 103 may be thin nickel sheets, thin sheets each formed by stacking a thin nickel sheet and a thin copper sheet, or a thin nickel-copper alloy sheet.

Accordingly, the first thin metal sheet 102, the PTC element 101, and the second thin metal sheet 103 may be stacked on each other. When being stacked, the first thin metal sheet 102 may include a first region B on which is stacked the PTC element 101 and the second thin metal sheet 103, and a second region A on which is not stacked the PTC element 101 and the second thin metal sheet 103 and is exposed.

The first thin metal sheet 102 may have a circular shape. The first thin metal sheet 102 may be formed to a size smaller than a portion of a secondary battery 300 to which the first thin metal sheet 102 is to be electrically connected.

The second thin metal sheet 103 may have a partial circular shape. The second thin metal sheet 103 may have the partial circular shape to expose the second region A of the first thin metal sheet 102 when the second thin metal sheet 103 is stacked on the first thin metal sheet 102.

Although the second thin metal sheet 103 has a half-circular shape in the present embodiment, the shape of the second thin metal sheet 103 is not limited thereto, and the second thin metal sheet 103 may have any of various shapes as long as the second region A of the first thin metal sheet 102 may be exposed. A curvature radius R2 of the second thin metal sheet 103 may be substantially the same as a curvature radius R1 of the first thin metal sheet 102.

The PTC element 101 may be interposed between the first thin metal sheet 102 and the second thin metal sheet 103. The PTC element 101 can have a partial ring shape. Although the PTC element 101 has a half-ring shape in the illustrated embodiment, the shape of the PTC element 101 is not limited thereto. An outer curvature radius R3 of the PTC element 101 may be substantially the same as the curvature radius R1 of the first thin metal sheet 102 and the curvature radius R2 of the second thin metal sheet 103.

Accordingly, the first thin metal sheet 102, the PTC element 102, and the second thin metal sheet 103, which are stacked on each other, may respectively have a circular shape, a partial ring shape, and a half-circular shape. Although the shapes of the first thin metal sheet 102, the PTC element 101, and the second thin metal sheet 103 are different from each other in the illustrated embodiment, the curvature radiuses R1, R3, and R2 of the first thin metal sheet 102, the PTC element 101, and the second thin metal sheet 103 are the same.

Furthermore, an insulator 104 may be interposed between the first thin metal sheet 102 and the second thin metal sheet 103. The insulator 104 may be employed so that the first thin metal sheet 102 and the second thin metal sheet 103 are not electrically connected to each other. Furthermore, the insulator 104 can prevent the second thin metal sheet 103 from being deformed when an external lead plate is welded to the second thin metal sheet 103.

The insulator 104 may have a partial circular shape. Although the insulator 104 has a half-circular shape in the illustrated embodiment, the shape of the insulator 104 is not limited thereto. A curvature radius R4 of the insulator 104 may be substantially the same as an inner curvature radius R5 of the PTC element 101. The insulator 104 may be positioned in an inner space formed by an inner wall of the PTC element 101.

Furthermore, a thickness t2 of the insulator 104 may be the same as a thickness t1 of the PTC element 101. Therefore, when the insulator 104 is positioned in the inner space formed by the inner wall of the PTC element 101, the horizontal surfaces of the PTC element 101 and the insulator 104 can form an even horizontal surface with respect to a horizontal surface of the second thin metal sheet 103.

Figure 2:
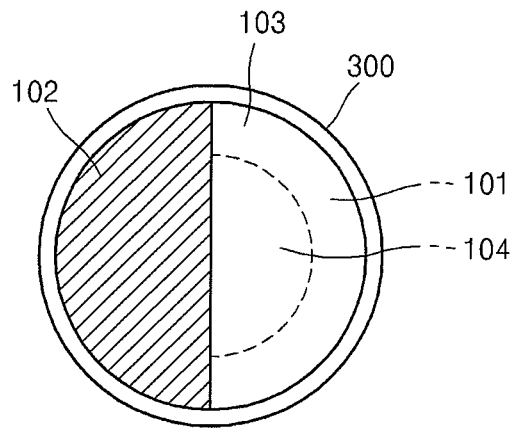
FIG. 2 is a bottom view showing the safety element assembly of FIG. 1 attached to a secondary battery.
Figure 3:
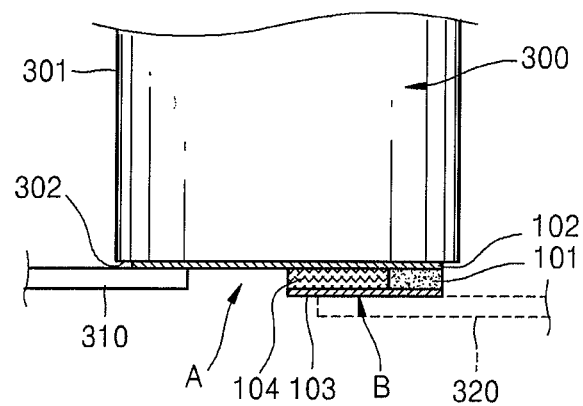
FIG. 3 is a sectional view showing the safety element assembly of FIG. 1 attached to the secondary battery.

FIG. 2 is a bottom view showing the safety element assembly 100 of FIG. 1 attached to the secondary battery 300, and FIG. 3 is a sectional view showing the safety element assembly 100 of FIG. 1 attached to the secondary battery 300.

Here, the secondary battery 300 includes a can 301. An electrode assembly (not shown), may be formed by rolling a positive electrode plate, a separator, and a negative electrode plate into a jelly-roll shape and may be housed in the can 310, and the can 301 may be electrically connected to either the positive electrode plate or the negative electrode plate to have a positive or negative polarity.

Referring to FIGS. 2 and 3, the first thin metal sheet 102 may be welded to a bottom surface 302 of the can 301. The size of the first thin metal sheet 102 may be less than the size of the bottom surface 302 of the can 301.

The PTC element 101 and the insulator 104 may be disposed on a top surface of the first thin metal sheet 102. The PTC element 101 may be thermally press-attached to the first thin metal sheet 102.

The insulator 104 may be positioned in the inner space formed by the inner wall of the PTC element 101. Since the thickness t2 of the insulator 104 is the same as the thickness t1 of the PTC element 101 in the illustrated embodiment, the horizontal surfaces of the PTC element 101 and the insulator 104 can form an even horizontal surface with respect to the second thin metal sheet 103. Therefore, a flat surface may be provided for welding an external lead plate 320, to be formed later.

At this point, the insulator 104 may be fixed to the first thin metal sheet 102 by using an adhesive, may be detachably interposed between the first thin metal sheet 102 and the second thin metal sheet 103, or may be arranged otherwise.

The second thin metal sheet 103 is arranged on the horizontal surfaces of the PTC element 101 and the insulator 104. The second thin metal sheet 103 is thermally press-attached to the PTC element 101.

Here, the size of the first thin metal sheet 102 may be larger than the size of the PTC element 101 and the insulator 104 combined. Furthermore, the size of the first thin metal sheet 102 may be larger than the size of the second thin metal sheet 103. Therefore, the second region A of the first thin metal sheet 102 is not covered by the PTC element 101, the insulator 104, or the second thin metal sheet 103, and is exposed in the illustrated embodiment. On the other hand, the first region B of the second thin metal sheet 103 is exposed on a surface opposite to the surface of the second thin metal sheet 103 attached to the PTC element 101.

In case of electric/electronic devices requiring high power energy, an end of an external lead plate 320 may be welded to the exposed second region A of the first thin metal sheet 102. On the other hand, in case of electric/electronic device requiring safe and high capacity energy, an end of the external lead plate 320 as is indicated with a dotted line in FIG. 3 may be welded to the first region B of the second thin metal sheet 103.

When the external lead plate 310 is connected to the first thin metal sheet 102, current flows directly to the first thin metal sheet 102 without flowing through the PTC element 101. When the external lead plate 320 is connected to the second thin metal sheet 103, current flows through the PTC element 101.

Therefore, based on how the secondary battery 300 is to be used, the secondary battery 300 may be applied to electric/electronic devices requiring the safety element assembly 100 or electric/electronic device not requiring the safety element assembly 100. In other words, the secondary battery 300 may selectively employ the safety element assembly 100 according to whether electric/electronic devices require high power or high capacity.

The safety element assembly 100 may be used in various manners as desired by being arranged not only inside the secondary battery 300, but also on an exterior of the secondary battery 300 (e.g., a top surface, a bottom surface, or one of side surfaces).

Figure 4:
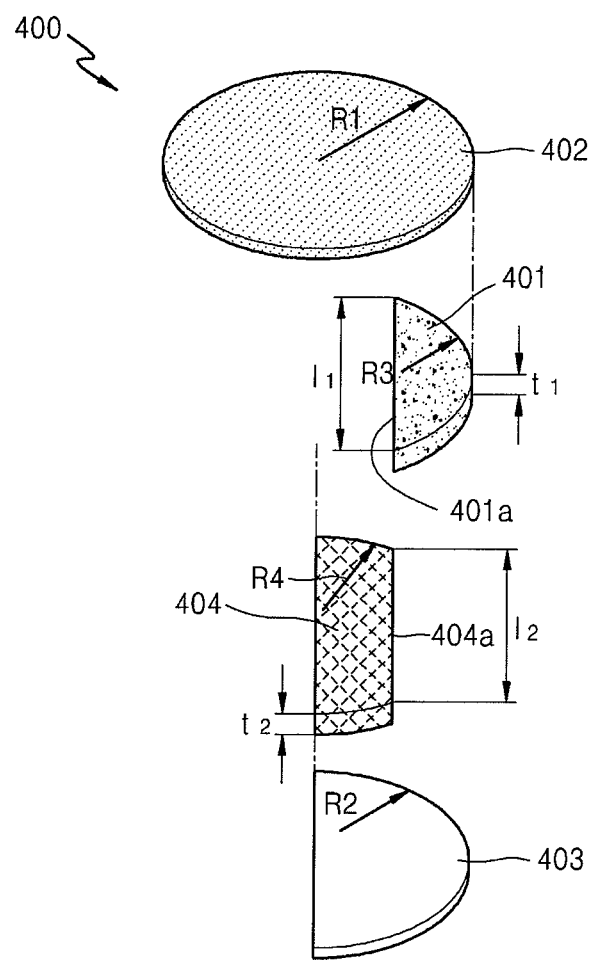
FIG. 4 is an exploded perspective view of a safety element assembly according to another embodiment of the present invention.

FIG. 4 is an exploded perspective view of a safety element assembly 400 according to another embodiment of the present invention.

Hereinafter, like reference numerals in the drawings denote like elements.

Referring to FIG. 4, the safety element assembly 400 includes a safety element 401, a first thin metal sheet 402, a second thin metal sheet 403, and an insulator 404.

The safety element 401 may be a PTC element.

The first thin metal sheet 402 may be located on a top surface of the PTC element 401, whereas the second thin metal sheet 403 may be located on a bottom surface of the PTC element 401. The insulator 404 may be interposed between the first thin metal sheet 402 and the second thin metal sheet 403.

Accordingly, the first thin metal sheet 402, the PTC element 401, and the second thin metal sheet 403 may be stacked on each other. When being stacked, the first thin metal sheet 402 can include a first region B on which the PTC element 401 and the second thin metal sheet 403 are stacked, and a second region A on which the PTC element 401 and the second thin metal sheet 403 are not stacked and thus is exposed.

In the illustrated embodiment, the first thin metal sheet 402 has a circular shape and the second thin metal sheet 403 has a partial circular shape. The second thin metal sheet 403 has the partial circular shape to expose the second region A of the first thin metal sheet 402 when the second thin metal sheet 403 is stacked on the first thin metal sheet 402.

Although the second thin metal sheet 403 has a half-circular shape in the illustrated embodiment, the shape of the second thin metal sheet 403 is not limited thereto, and the second thin metal sheet 403 may have any of various shapes as long as the second region A of the first thin metal sheet 402 may be exposed. A curvature radius R2 of the second thin metal sheet 403 may be substantially the same as a curvature radius R1 of the first thin metal sheet 402.

In the illustrated embodiment, the PTC element 401 has a circular shape that is substantially the same as the circular shape of the first thin metal sheet 402 except that the PTC element 401 has a partial circular shape. Although the PTC element 401 has the shape of a circle, from which half or more of the entire circle is removed, in the present embodiment, the shape of the PTC element 401 is not limited thereto. A curvature radius R3 of the PTC element 401 may be substantially the same as the curvature radius R1 of the first thin metal sheet 402 and the curvature radius R2 of the second thin metal sheet 403.

In the illustrated embodiment, the insulator 404 has a circular shape substantially the same as the circular shape of the first thin metal sheet 402 except that the insulator 404 has a circular shape of which two portions at opposite sides are cut. A curvature radius R4 of the insulator 404 is substantially the same as the curvature radius R1 of the first thin metal sheet 402.

Furthermore, a length l2 of a straight-cut end 404a of the insulator 404 may be the same as a length l1 of a cut end 401a of the PTC element 401. A thickness t2 of the insulator 404 may be the same as a thickness t1 of the PTC element 401.

When the insulator 404 is attached to the PTC element 401, the cut ends 401a and 404a may be arranged to contact each other, and horizontal surfaces of the insulator 404 and the 401 form an even horizontal surface.

Figure 5:
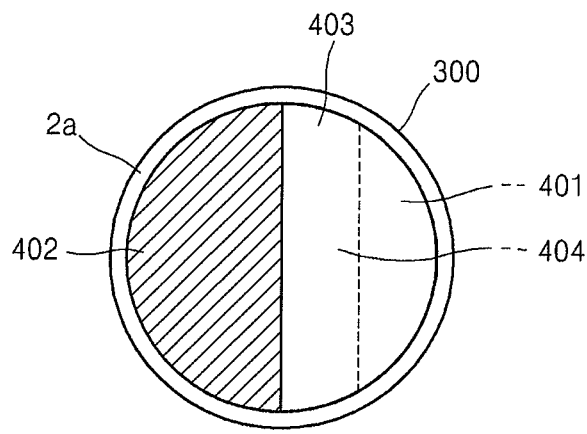
FIG. 5 is a bottom view showing the safety element assembly of FIG. 4 attached to the secondary battery.
Figure 6:
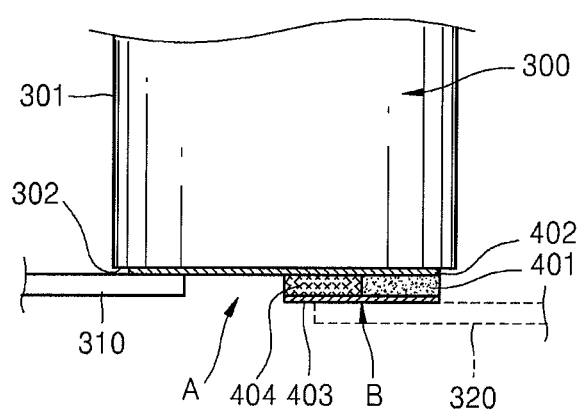
FIG. 6 is a sectional view showing the safety element assembly of FIG. 4 attached to the secondary battery.

FIG. 5 is a bottom view showing the safety element assembly 400 of FIG. 4 attached to the secondary battery 300, and FIG. 6 is a sectional view showing the safety element assembly 400 of FIG. 4 attached to the secondary battery 300.

Referring to FIGS. 5 and 6, the first thin metal sheet 402 may be welded to the bottom surface 302 of the can 301. The PTC element 401 and the insulator 404 may be arranged on a top surface of the second thin metal sheet 403 and form an even horizontal surface. The straight-cut portion 404a of the insulator 404 may contact the cut end 401a of the PTC element 401. The second thin metal sheet 403 may be arranged on the PTC element 401 and the insulator 404.

Here, the size of the first thin metal sheet 402 may be larger than sum of the size of the PTC element 401 and the size of the insulator 404. Furthermore, the size of the first thin metal sheet 402 may be larger than the size of the second thin metal sheet 403. Therefore, the second region A of the first thin metal sheet 402 can be exposed. On the other hand, the first region B of the second thin metal sheet 403 is exposed on a surface opposite to the surface of the second thin metal sheet 403 attached to the PTC element 401.

Therefore, based on how the secondary battery 300 is to be used, ends of the external lead plates 310 and 320 may be selectively welded to the exposed second region A of the first thin metal sheet 402 or the exposed first region B of the second thin metal sheet 403.

Figure 7:
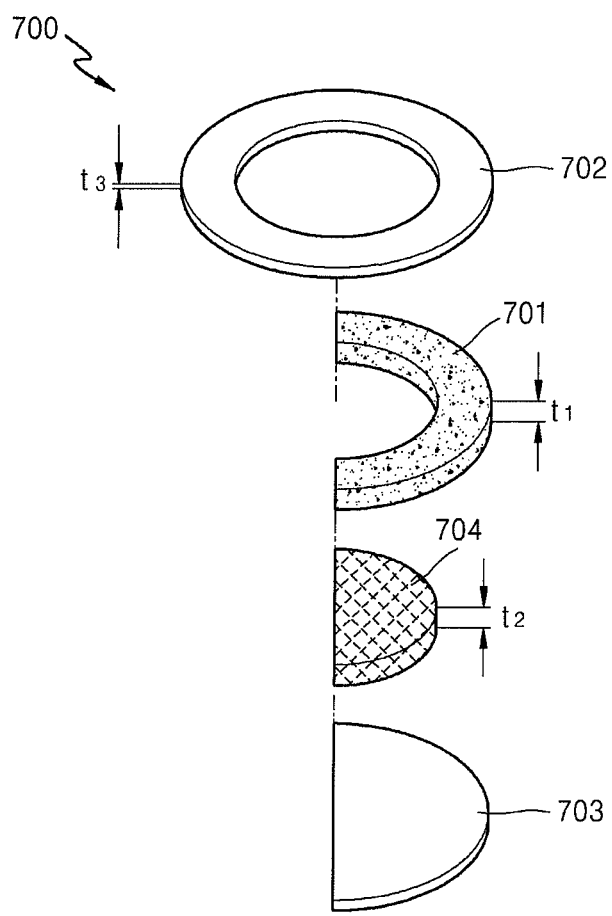
FIG. 7 is an exploded perspective view of a safety element assembly according to another embodiment of the present invention.
Figure 8:
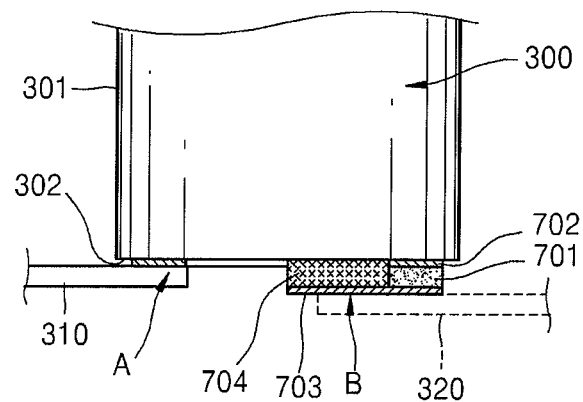
FIG. 8 is a diagram showing the safety element assembly of FIG. 7 attached to the secondary battery.

FIG. 7 is an exploded perspective view of a safety element assembly 700 according to another embodiment of the present invention, and FIG. 8 is a diagram showing the safety element assembly 700 of FIG. 7 attached to the secondary battery 300.

Referring to FIGS. 7 and 8, the safety element assembly 700 includes a safety element 701, a first thin metal sheet 702, a second thin metal sheet 703, and an insulator 704.

The safety element 701 may be a PTC element.

In the illustrated embodiment, the first thin metal sheet 702 is located on a top surface of the PTC element 701, whereas the second thin metal sheet 703 is located on a bottom surface of the PTC element 701. The insulator 704 may be interposed between the first thin metal sheet 702 and the second thin metal sheet 703.

Accordingly, the first thin metal sheet 702, the PTC element 701, and the second thin metal sheet 703 are stacked on each other. When being stacked, the first thin metal sheet 702 includes a first region B on which the PTC element 701 and the second thin metal sheet 703 are stacked, and a second region A on which the PTC element 701 and the second thin metal sheet 703 are not stacked and thus is exposed.

The PTC element 701, the second thin metal sheet 703, and the insulator 704 according to the illustrated embodiment have shapes and curvature radiuses respectively corresponding to those of the PTC element 101, the second thin metal sheet 103, and the insulator 104 according to the embodiment shown in FIG. 1. Therefore, the detailed descriptions thereof will be omitted here.

According to the present embodiment illustrated in FIG. 7, as compared to the embodiment shown in FIG. 1, the first thin metal sheet 702 has a ring shape instead of a circular shape, and the thickness t2 of the insulator 704 is the same as the sum of the thickness t1 of the PTC element 701 and the thickness t3 of the first thin metal sheet 702.

The first thin metal sheet 702 of the safety element assembly 700 having the configuration as described above may be welded to the bottom surface 302 of the can 301. The PTC element 701 may be thermally press-attached to the first thin metal sheet 702.

The insulator 704 may be positioned in an inner space formed by the inner wall of the PTC element 701. Since the thickness t2 of the insulator 704 is the same as the sum of the thickness t1 of the PTC element 701 and the thickness t3 of the first thin metal sheet 702, the top surface of the insulator 704 can contact the bottom surface 302 of the can 301 and may be fixed thereto. Horizontal surfaces of the PTC element 701 and the insulator 704 may form even horizontal surfaces with respect to a horizontal surface of the second thin metal sheet 703.

The second thin metal sheet 703 may be arranged on the PTC element 701 and the insulator 704. The second thin metal sheet 703 may be thermally press-attached to the PTC element 701.

Therefore, based on how the secondary battery 300 is to be used, ends of the external lead plates 310 and 320 may be selectively welded to the exposed second region A of the first thin metal sheet 702 or the exposed first region B of the second thin metal sheet 703.

Figure 9:
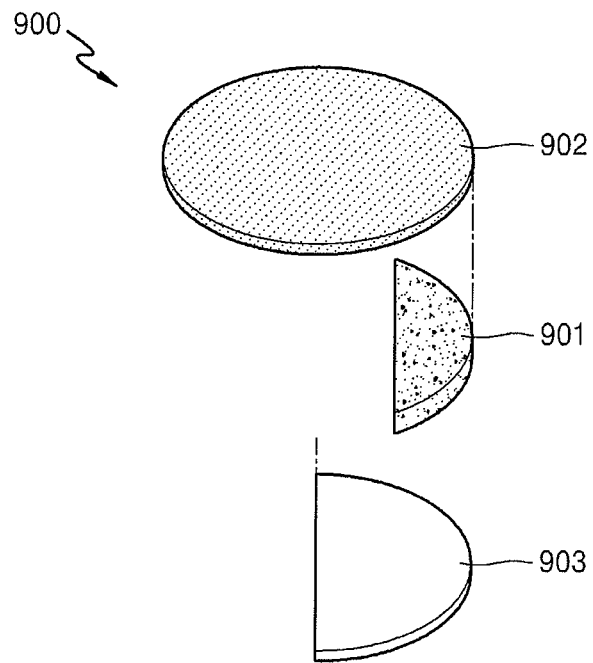
FIG. 9 is an exploded perspective view of a safety element assembly according to another embodiment of the present invention.
Figure 10:
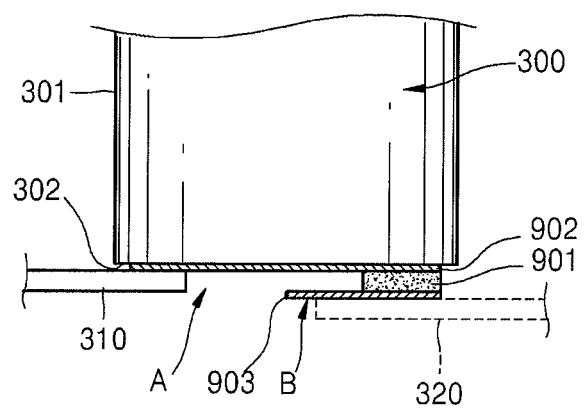
FIG. 10 is a diagram showing the safety element assembly of FIG. 4 attached to the secondary battery.

FIG. 9 is an exploded perspective view of a safety element assembly 900 according to another embodiment of the present invention, and FIG. 10 is a diagram showing the safety element assembly 900 of FIG. 4 attached to the secondary battery 300.

Referring to FIGS. 9 and 10, the safety element assembly 900 includes a safety element 901, a first thin metal sheet 902, and a second thin metal sheet 903.

The safety element 901 may be a PTC element.

In the illustrated embodiment, the first thin metal sheet 902 is located on a top surface of the PTC element 901, whereas the second thin metal sheet 903 is located on a bottom surface of the PTC element 901.

Accordingly, the first thin metal sheet 902, the PTC element 901, and the second thin metal sheet 903 are stacked on each other. When being stacked, the first thin metal sheet 902 includes a first region B on which the PTC element 901 and the second thin metal sheet 903 are stacked, and a second region A on which the PTC element 901 and the second thin metal sheet 903 are not stacked and thus is exposed.

In the illustrated embodiment, the PTC element 901, the first thin metal sheet 902, and the second thin metal sheet 903 according to the present embodiment have shapes and curvature radiuses respectively corresponding to those of the PTC element 401, the first thin metal sheet 402, and the second thin metal sheet 403 according to the embodiment shown in FIG. 4. Therefore, the detailed descriptions thereof will be omitted here.

According to the present embodiment illustrated in FIG. 9, as compared to the embodiment shown in FIG. 4, no insulator is interposed between the first thin metal sheet 902 and the second thin metal sheet 903. Therefore, a space in which a welding jig may be selectively arranged and no insulator exists may be formed between the first thin metal sheet 901 and the second thin metal sheet 902 in the first region B of the first thin metal sheet 902, on which the PTC element 901 is disposed.

The first thin metal sheet 902 of the safety element assembly 900 having the configuration as described above may be welded to the bottom surface 302 of the can 301. The PTC element 901 may be thermally press-attached to the first thin metal sheet 902. The second thin metal sheet 903 may be arranged on the PTC element 901. The second thin metal sheet 903 may be thermally press-attached to the PTC element 901.

Figure 11:
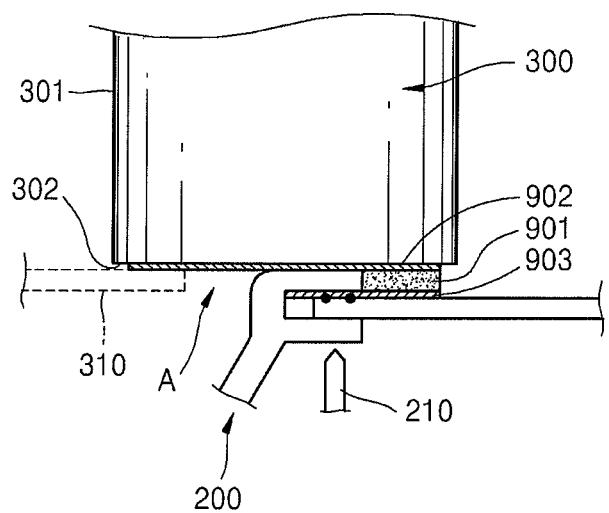
FIG. 11 is a diagram showing that a welding jig is arranged on the safety element assembly.

Here, as shown in FIG. 11, the external lead plate 320 may be directly welded to the exposed second region A of the first thin metal sheet 903 without using a welding jig.

On the contrary, when the external lead plate 320 is welded to the exposed region B of the second thin metal sheet 903, a welding jig 200 may be positioned in the space between the first thin metal sheet 902 and the second thin metal sheet 903, in which no insulator exists, and then the external lead plate 320 may be welded to the second thin metal sheet 903 by using a welding rod 210. Here, a portion of the external lead plate 320, which is the portion facing the welding jig 200, may be welded with respect to the second thin metal sheet 903.

Figure 12:
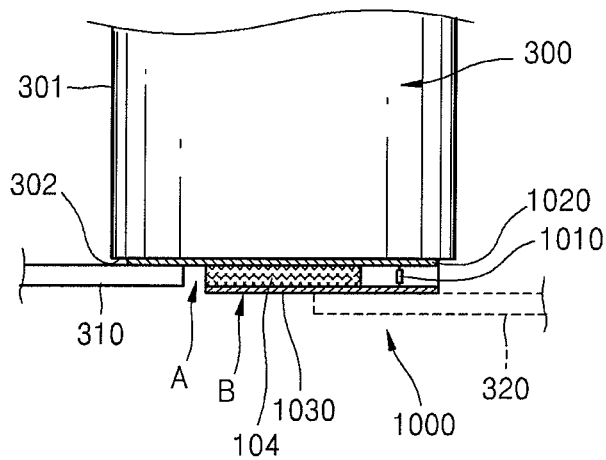
FIG. 12 is a diagram showing a safety element assembly according to another embodiment of the present invention attached to the secondary battery.

FIG. 12 is a diagram showing a safety element assembly 1000 according to another embodiment of the present invention attached to the secondary battery 300.

Referring to FIG. 12, the safety element assembly 1000 may include a safety element 1010, a first thin metal sheet 1020, a second thin metal sheet 1030, and an insulator 1040.

Here, unlike the previous embodiments, the safety element 1010 may be a thermal fuse. When a temperature of the secondary battery 300 exceeds a predetermined point, electrical resistance of a PTC element can increase significantly, and thus the PTC element can shut down a circuit. However, when the temperature of the secondary battery 300 drops below the predetermined point, the electrical resistance of the PTC element can be reduced, and thus the PTC element may be re-used. However, according to the present embodiment, when the temperature of the secondary battery 300 exceeds a predetermined point, a conductive line in the thermal fuse 1010 may be physically cut to shut down a circuit.

The thermal fuse 1010 can shut off a circuit when the temperature of the secondary battery 300 significantly increases in abnormal environments or under abnormal conditions of using the secondary battery 300, like a PTC element. However, unlike a PTC element, it is may become necessary to replace the safety element assembly 1000 after the thermal fuse 1010 is blown.

A first end of the thermal fuse 1010 may be electrically connected to the first thin metal sheet 1020, a second end of the thermal fuse 1010 may be electrically connected to the second thin metal sheet 1030, and the insulator 1040 may be interposed between the first thin metal sheet 1020 and the second thin metal sheet 1030 around the thermal fuse 1010.

As described above, the embodiments shown in FIGS. 1 through 12 provide safety element assemblies having substantially the same curvature radiuses. In other words, a safety element assembly having a configuration as described above may be applied to a cylindrical type secondary battery.

However, the safety element assembly may be applied not only to a cylindrical type secondary battery, but also to a rectangular type battery or a pouch type secondary battery.

Here, the safety element assembly may be manufactured to have any non-cylindrical shape, as long as an exposed second region of a first thin metal sheet and an exposed first region of a second thin metal sheet are secured.

Figure 13:
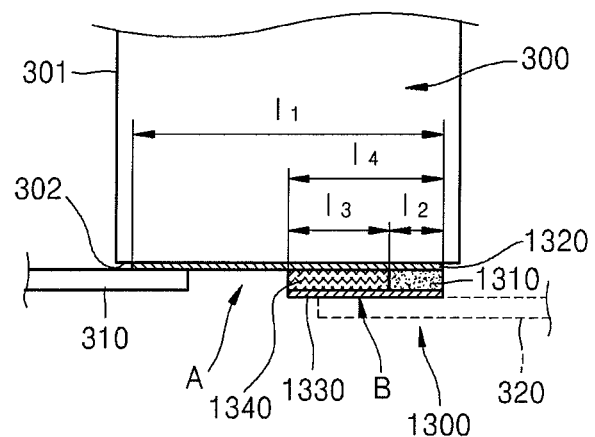
FIG. 13 is a diagram showing a safety element assembly according to another embodiment of the present invention attached to the secondary battery.

For example, referring to FIG. 13, a safety element assembly 1300 can include a safety element 1310, a first thin metal sheet 1320, a second thin metal sheet 1330, and an insulator 1340.

The safety element 1310 may be a PTC element.

The first thin metal sheet 1320 may be located on a top surface of the PTC element 1310, the second thin metal sheet 1330 may be located on a bottom surface of the PTC element 1310, and the insulator 1340 may be located on a sidewall of the PTC element 1310.

Accordingly, the first thin metal sheet 1320, the PTC element 1310, and the second thin metal sheet 1330 may be stacked on each other. When being stacked, the first thin metal sheet 1320 can include a first region B on which the PTC element 1310 and the second thin metal sheet 1330 are stacked, and a second region A on which the PTC element 1310 and the second thin metal sheet 1330 are not stacked and thus is exposed.

The first thin metal sheet 1320 of the safety element assembly 1300 having the configuration as described above may be welded to the bottom surface 302 of the can 301. The PTC element 1310 may be thermally press-attached to the first thin metal sheet 1320. The second thin metal sheet 1330 may be thermally press-attached to the PTC element 1310.

Here, an overall length l1 of the first thin metal sheet 1320 may be longer than a sum of a length l2 of the PTC element 1310 and a length l3 of the insulator 1340. Therefore, even when the PTC element 1310 and the insulator 1340 are stacked on the first thin metal sheet 1320, the second region A of the first thin metal sheet 1320 may be exposed.

Furthermore, the overall length l1 of the first thin metal sheet 1320 can be longer than a length l4 of the second thin metal sheet 1330. Meanwhile, the first region B of the second thin metal sheet 1330 may be exposed.

Therefore, based on how the secondary battery 300 is used, ends of the external lead plates 310 and 320 may be selectively welded to the exposed second region A of the first thin metal sheet 1320 or the exposed first region B of the second thin metal sheet 1330.

Hereinafter, referring to FIGS. 14A through 14D, a method of manufacturing the secondary battery 300, to which the safety element assembly 100 shown in FIG. 1 may be installed, will be described.

Figure 14A:
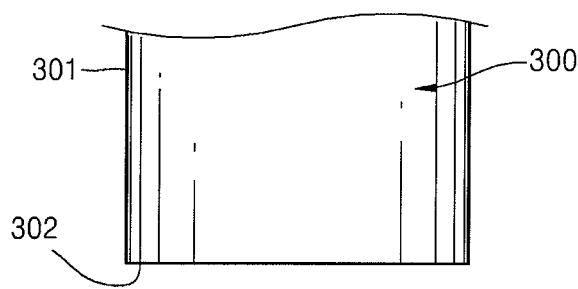
FIGS. 14A through 14D are sectional views showing a process of attaching the safety element assembly of FIG. 1, where

First, as shown in FIG. 14A, the can 301 is prepared. Here, an electrode assembly may or may not be housed in the can 301.

Figure 14B:
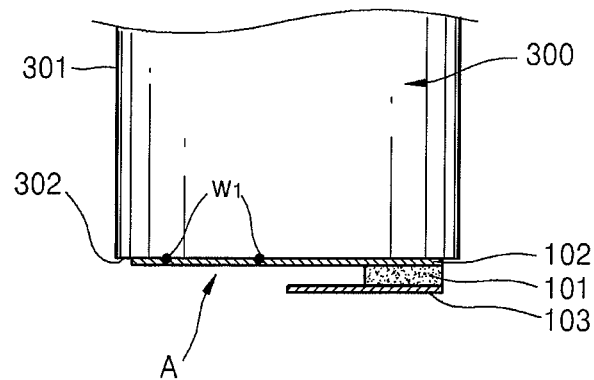

Next, as shown in FIG. 14B, the safety element assembly 100, in which the first thin metal sheet 102, the PTC element 101, and the second thin metal sheet 103 are sequentially stacked, may be attached to the bottom surface 302 of the can 301.

Here, forming of the safety element assembly 100 is not limited to a specific sequence. For example, the insulator 104 may be fixed between the first thin metal sheet 102 and the second thin metal sheet 103, or the insulator 104 may be inserted in a later operation.

The first thin metal sheet 102 may be attached with respect to the bottom surface 302 of the can 301 by using any of various methods, e.g., a welding method (e.g. electric resistance welding), a solder-attaching method, or an attaching method using a conductive adhesive. In the case of the electric resistance welding, the bottom surface 302 of the can 301 may be welded to the exposed second portion A of the first thin metal sheet 102. Here, a number of welding points W1 may be one. However, the number of the welding points W1 may be two or more.

Figure 14C:
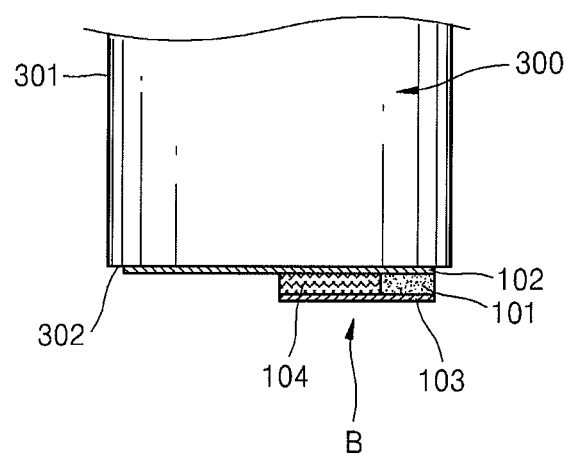

Next, as shown in FIG. 14C, the insulator 104 may be positioned between the first thin metal sheet 102 and the second thin metal sheet 103. The insulator 104 can be inserted into a space formed between the first thin metal sheet 102 and the second thin metal sheet 103. Here, the insulator 104 may be either positioned on the inner wall of the PTC element 101 or a predetermined interval apart from the inner wall of the PTC element 101. Alternatively, the insulator 104 may be fixed between the first thin metal sheet 102 and the second thin metal sheet 103 in advance by using a non-conductive adhesive.

Figure 14D:
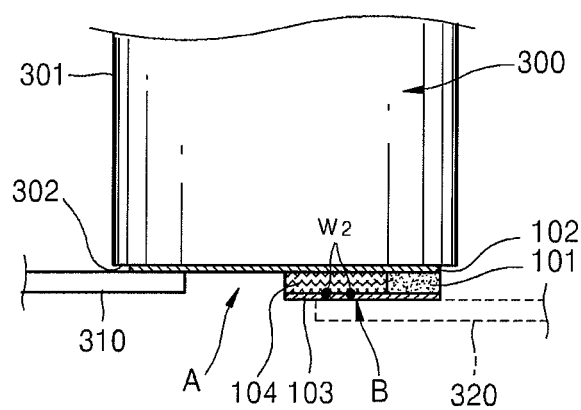

Next, as shown in FIG. 14D, the external lead plate 320 may be positioned on the exposed first region B of the second thin metal sheet 103 and may be welded thereto. The number of the welding points W2 may be two or more. However, the present embodiment is not limited thereto.

In the case of the electric resistance welding, a welding rod can press the first region B of the second thin metal sheet 103. However, since the insulator 104 supports the second thin metal sheet 103, the second thin metal sheet 103 is not deformed during the welding operation in the illustrated embodiment.

Furthermore, damages to the PTC element 101 may be prevented by performing the welding operation with respect to the first region B of the second thin metal sheet 104 corresponding to the insulator 104, instead of performing the welding operation with respect to a portion of the second thin metal sheet 103 corresponding to the PTC element 101.

Accordingly, in the case where the external lead plate 320 is connected to the second thin metal sheet 103, a discharging circuitry of the secondary battery 300 includes the PTC element 101, and thus the secondary battery 300 may be suitable for electric/electronic devices requiring safety and high capacity.

Meanwhile, in the case where the external lead plate 310 is connected to the exposed second portion A of the first thin metal sheet 102, the discharging circuitry of the secondary battery 300 does not include the PTC element 101, and thus the secondary battery 300 may be suitable for electric/electronic devices requiring high power.

The following effects may be obtained from safety element assemblies according to embodiments of the present invention.

First, since a plurality of thin metal sheets having different shapes may be formed on the two opposite surfaces of a PTC element, different regions of the plurality of thin metal sheets may be exposed. Therefore, a standardized secondary battery manufactured in compliance with the same standards may be used either for high power or high capacity based on how the secondary battery is to be used.

Second, as an insulator may be interposed between a plurality of thin metal sheets, deformation of the plurality of thin metal sheets or a safety element while an external lead plate is being welded to the thin metal sheets may be prevented.

Third, a standardized secondary battery manufactured in compliance with the same standards may be used either for high power or high capacity by arranging a safety element assembly on various locations of the exterior of the secondary battery (e.g. a top surface, a bottom surface, or one of side surfaces).

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. A safety element assembly for a secondary battery wherein the secondary battery comprises a battery can with an interior and exterior, the safety element assembly comprising:
    a first thin metal sheet coupled to the exterior of the battery can of the secondary battery;
    a safety element coupled to the first thin metal sheet;
    a second thin metal sheet coupled to the safety element;
    an insulator interposed between the first thin metal sheet and the second thin metal sheet;
    wherein the first thin metal sheet comprises a first region on which the safety element and the second thin metal sheet are stacked, and a second region on which the safety element and the second thin metal sheet are not stacked wherein the first thin metal sheet is larger than the second thin metal sheet;
    wherein a surface of the second thin metal sheet opposite to a surface of the second thin metal sheet on which the safety element is attached is entirely exposed outside the battery can;
    wherein an end of an external lead plate of an electric/electronic device requiring high power energy is welded to the first region of the first thin metal sheet without the safety device interposed therebetween, and
    an end of an external lead plate of an electric/electronic device requiring high capacity energy is welded to the second surface of the second thin metal sheet with the safety device interposed therebetween.

2. The safety element assembly of claim 1, wherein curvature radii of the first thin metal sheet, the safety element, and the second thin metal sheet are the same, and
    the safety element and the second thin metal sheet are at least partially cut, so that the second region of the first thin metal sheet is exposed.

3. The safety element assembly of claim 1, wherein the safety element comprises a positive temperature coefficient (PTC) element.

4. The safety element assembly of claim 1, wherein the safety element comprises a thermal fuse.

5. The safety element assembly of claim 1, wherein horizontal surfaces of the insulator and the safety element facing the second thin metal sheet form an even horizontal surface.

6. The safety element assembly of claim 5, wherein the first thin metal sheet has a surface that is larger than surfaces of the safety element and the insulator combined.

7. The safety element assembly of claim 1, wherein curvature radii of the first thin metal sheet, the safety element, and the second thin metal sheet are the same,
    the first thin metal sheet has a circular shape,
    the second thin metal sheet has a partial circular shape,
    the safety element is a PTC element having a partial ring shape, and
    the insulator has a partial circular shape and is located in a space formed by an inner wall of the PTC element.

8. The safety element assembly of claim 7, wherein the inner curvature radius of the safety element is the same as a curvature radius of the insulator, and
    an outer curvature radius of the safety element is the same as the curvature radius of the first thin metal sheet.

9. The safety element assembly of claim 7, wherein a thickness of the insulator is the same as a thickness of the safety element, and
    surfaces of the insulator and the safety element facing the second thin metal sheet form an even horizontal surface.

10. The safety element assembly of claim 1, wherein curvature radii of the first thin metal sheet, the safety element, and the second thin metal sheet are the same,
the first thin metal sheet has a circular shape,
the second thin metal sheet has a partial circular shape,
the safety element is a PTC element having a partial circular shape and a cut end,
the insulator has a circular shape of which two portions at opposite sides are cut with straight edges, and
the insulator is arranged such that a straight edge of the insulator contacts the cut end of the safety element.

11. The safety element assembly of claim 10, wherein a length of a straight edge of the insulator is the same as a length of the cut end of the safety element.

12. The safety element assembly of claim 10, wherein a thickness of the insulator is the same as a thickness of the safety element, and
surfaces of the insulator and the safety element facing the second thin metal sheet form an even horizontal surface.

13. The safety element assembly of claim 1, wherein curvature radii of the first thin metal sheet, the safety element, and the second thin metal sheet are the same,
the first thin metal sheet has a ring shape,
the second thin metal sheet has a partial circular shape,
the safety element is a PTC element having a partial ring shape, and
the insulator has a partial circular shape and is located in a space formed by an inner wall of the safety element.

14. The safety element assembly of claim 13, wherein an inner curvature radius of the safety element is same as the curvature radius of the insulator, and
an outer curvature radius of the safety element is the same as the curvature radius of the first thin metal sheet.

15. The safety element assembly of claim 13, a thickness of the insulator is larger than a combined thickness of the safety element and of the first thin metal sheet, and
surfaces of the insulator and the safety element facing the second thin metal sheet form an even horizontal surface.

16. The safety element assembly of claim 1, wherein curvature radii of the first thin metal sheet, the safety element, and the second thin metal sheet are the same,
the first thin metal sheet has a circular shape,
the second thin metal sheet has a partial circular shape, and
the safety element is a PTC element having a partial circular shape.

17. The safety element assembly of claim 16, wherein a space is formed between the first thin metal sheet and the second thin metal sheet facing each other in the first region, and a welding jig is selectively arranged in the space.

18. The safety element assembly of claim 1, wherein the safety element is a thermal fuse of which a first end is electrically connected to the first thin metal sheet and a second end is electrically connected to the second thin metal sheet, and
the insulator is arranged between the first thin metal sheet and the second thin metal sheet around the thermal fuse.

19. The safety element assembly of claim 1, wherein the insulator is arranged on a sidewall of the safety element, and
the first thin metal sheet has a surface that is larger than surfaces of the safety element and the insulator combined.

20. The safety element assembly of claim 19, wherein surfaces of the insulator and the safety element facing the second thin metal sheet form an even horizontal surface.

* * * * *